(12) United States Patent
Wang et al.

(10) Patent No.: US 10,833,833 B2
(45) Date of Patent: Nov. 10, 2020

(54) MONITORING INSTRUCTING AND MONITORING METHOD AND APPARATUS WITH SHORT TRANSMISSION TIME INTERVAL

(71) Applicant: China Academy of Telecommunications Technology, Beijing (CN)

(72) Inventors: Lei Wang, Beijing (CN); Xueming Pan, Beijing (CN)

(73) Assignee: China Academy of Telecommunications Technolgoy, Beijing (CN)

(*) Notice: Subject to any disclaimer, the term of this patent is extended or adjusted under 35 U.S.C. 154(b) by 0 days.

(21) Appl. No.: 16/346,110

(22) PCT Filed: Sep. 29, 2017

(86) PCT No.: PCT/CN2017/104220
§ 371 (c)(1),
(2) Date: Apr. 29, 2019

(87) PCT Pub. No.: WO2018/082420
PCT Pub. Date: May 11, 2018

(65) Prior Publication Data
US 2019/0260558 A1 Aug. 22, 2019

(30) Foreign Application Priority Data

Nov. 4, 2016 (CN) .......................... 2016 1 0974715

(51) Int. Cl.
*H04L 5/00* (2006.01)
*H04J 11/00* (2006.01)
(Continued)

(52) U.S. Cl.
CPC ........ *H04L 5/0082* (2013.01); *H04J 11/0069* (2013.01); *H04L 5/00* (2013.01);
(Continued)

(58) Field of Classification Search
CPC ....... H04L 5/0082; H04L 5/00; H04L 5/0053; H04L 5/0092; H04J 11/0069;
(Continued)

(56) References Cited

U.S. PATENT DOCUMENTS

2016/0128028 A1* 5/2016 Mallik .................. H04L 1/1861
370/336
2016/0270059 A1* 9/2016 Chen ..................... H04L 5/0051
(Continued)

FOREIGN PATENT DOCUMENTS

CN 1725369 A 1/2006
CN 101568153 A 10/2009
(Continued)

OTHER PUBLICATIONS

InterDigital, "Consideration on sPDCCH Design", R1-165049, 3GPP TSG RAN WG1 Meeting #85, Nanjing, China, May 23-27, 2016.
(Continued)

*Primary Examiner* — Sharad Rampuria
(74) *Attorney, Agent, or Firm* — Kilpatrick Townsend & Stockton, LLP

(57) ABSTRACT

Disclosed are a monitoring instructing and monitoring method and apparatus with a short transmission time interval. The method comprises: determining whether there is a short transmission time interval service at a network side; and instructing whether a terminal needs to monitor a downlink control channel of the short transmission time interval according to the condition whether there is a short transmission time interval service; receiving an instruction instructing whether to monitor the downlink control channel
(Continued)

```
┌─────────────────────────────────────────┐
│   Determining at the network side       │ ── 301
│   whether there is a short-TTI service  │
└─────────────────────────────────────────┘
                    │
                    ▼
┌─────────────────────────────────────────┐
│ Instructing whether the UE needs to     │
│ listen to a downlink control channel in a│ ── 302
│ short TTI, according to whether there is │
│         a short-TTI service              │
└─────────────────────────────────────────┘
``` of the short transmission time interval at the terminal side; and monitoring the downlink control channel of the short transmission time interval according to the instruction. According to the present application, a terminal having a short transmission time interval capability no longer needs to monitor a downlink control channel at each short transmission time interval, and no excessive consumption and waste of energy will be caused.

12 Claims, 4 Drawing Sheets

(51) Int. Cl.

| | | |
|---|---|---|
| *H04W 72/04* | (2009.01) | |
| *H04W 8/02* | (2009.01) | |
| *H04W 72/12* | (2009.01) | |
| *H04W 52/02* | (2009.01) | |
| *H04W 80/02* | (2009.01) | |

(52) U.S. Cl.
CPC ........... *H04W 52/02* (2013.01); *H04W 72/04* (2013.01); *H04W 72/042* (2013.01); *H04W 72/0446* (2013.01); *H04W 72/12* (2013.01); *H04W 80/02* (2013.01); *Y02D 30/70* (2020.08)

(58) Field of Classification Search
CPC ............. H04J 2203/0069; Y02D 70/00; H04B 7/2123; H04B 7/2121; H04Q 2213/394; H04W 72/04; H04W 72/12; H04W 76/00; H04W 52/02; H04W 72/042; H04W 72/0446; H04W 80/02; H04W 72/1289
See application file for complete search history.

(56) References Cited

U.S. PATENT DOCUMENTS

2016/0270116 A1\* 9/2016 Lin ........................ H04W 72/14
2018/0109994 A1\* 4/2018 Lee ........................ H04W 48/12

FOREIGN PATENT DOCUMENTS

| CN | 201409229 Y | 2/2010 |
|---|---|---|
| WO | 2016040290 A1 | 3/2016 |
| WO | 2016064039 A1 | 4/2016 |
| WO | 2016064048 A1 | 4/2016 |
| WO | 2016160330 A1 | 10/2016 |
| WO | 2016163623 A1 | 10/2016 |
| WO | 2016175596 A1 | 11/2016 |

OTHER PUBLICATIONS

Interdigital Communications: "On sPDCCH Design", 3GPP Draft; R1-1610096_STTI_SPDCCH, 3$^{rd}$ Generation Partnership Project (3GPP), Mobile Competence Centre; 650, Route des Lucioles; F-06921 Sophia-Antipolis Cedex; France, vol. RAN WG1, No. Lisbon, Portugal; Oct. 10, 2016-Oct. 14, 2016 Oct. 9, 2016, XP051150121, Retrieved from the Internet: URL:http://www.3gpp.org/ftplMeetings_3GPP_SYNC/RAN1/Doc/ * section "1. Introduction", subsection "Conclusion for study till RAN1#85"; Section "2.1 sPDCCH resource configuration"; figure 1, 4 pages.

Nokia et al., "On DL control channel design for shorter TTI operation", 3GPP Draft; R1-1609322 on Design of DL Control Channel for Shorter TTI Operation, 3$^{rd}$ Generation Partnership Project (3GPP), Mobile Competence Centre; 650; Route des Lucioles; F-06921 Sophia-Antipol, vol. RAN WG1, No. Lisbon, Portugal; Oct. 10, 2016-Oct. 14, 2016, Oct. 9, 2016, XP051149367, Retrieved from Internet: URL: http:www.3gpp.org/ftp/Meetings_3GPP_SYNC/RAN1/Docs/, Section "2. On sPDCCH design" until p. 2, "Proposal 3", 5 pages.

Panasonic: "Discussion on Single level DCI and two-level DCI", 3GPP Draft; R1-1609575, 3$^{rd}$ Generation Partnership Project (3GPP), Mobile Competence Centre; 650, Route des Lucioles; F-06921 Sophia-Antipolis Cedex; France, vol. RAN WG1, No. Lisbon, Portugal; Oct. 10, 2016-Oct. 14, 2016 Oct. 9, 2016, XP051149612, Retrieved from the Internet: URL: http://www.3gpp.org/ftp/Meetings_3GPP_SYNC/RAN1/Docs/* p. 1, section "Two level DCI Alt 1" and page 2, section "Two level DCI Alt 2"; Table 1; section "sPDCCH monitoring configuration"; figures 2,3, 5 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP Standard; 3GPP TS 36.321, 3$^{rd}$ Generation Partnership Project (3GPP), Mobile Competence Centre; 650, Route des Lucioles; F-06921 Sophia-Antipolis Cedex; France, vol. RAN WG2, No. V14.0.0, Oct. 3, 2016, pp. 1-96, XP051172893, * Section "6.1.3.8 Activation / Deactivation MAC Control Elements" * 96 pages.

Nokia et al., "On design of DL control channel for shorter TTI operation", 3GPP TSG-RAN WG1 Meeting #84bis, R1-163267, Busan, South Korea, Mar. 11-15, 2016, 5 pages.

Nokia et at, "Considerations on shorter TTI for TDD duplex mode", 3GPP TSG-RAN WG1 Meeting #85, R1-164924, Nanjing, P.R. China May 23-27, 2016, 5 pages.

Nokia et al., "On two-level DL control channel design for shorter TTI operation", 3GPP TSG-RAN WG1 Meeting #85, R1-165237, Nanjing, China, May 23-27, 2016, 5 pages.

\* cited by examiner

MONITORING INSTRUCTING AND MONITORING METHOD AND APPARATUS WITH SHORT TRANSMISSION TIME INTERVAL

This application is a National Stage of International Application No. PCT/CN2017/104220, filed on Sep. 29, 2017, which claims the benefit of Chinese Patent Application No. 201610974715.6, filed with the Chinese Patent Office on Nov. 4, 2016, and entitled "A method and apparatus for instructing a listen in a short transmission time interval, and a method and apparatus for listening in a short transmission time interval", both of which are hereby incorporated by reference in their entireties.

FIELD

The present invention relates to the field of communications, and particularly to a method and apparatus for instructing a listen in a short transmission time interval, and a method and apparatus for listening in a short transmission time interval.

BACKGROUND

The mobile Internet is overthrowing the traditionally mobile communication service paradigm, providing the users with an unprecedented user experience, and affecting numerous aspects in our working and living. The mobile Internet will promote further upgrading of information exchanges in our society, and provide the users with more abundant service experiences of augmented reality, virtual reality, ultra-high-definition (3D) videos, a mobile cloud, etc. Further development of the mobile Internet will come with such an amount of mobile traffic in future that may grow by a factor of thousands, and promote new revolution of the mobile communication technologies and industries. The mobile Internet will extend a service range of mobile communications from human-to-human communication to human-to-object, and object-to-object intelligent intercommunication so that the mobile communication technologies will be pervaded in more industries and fields. In future, mobile medical services, the internet of vehicles, intelligent home services, industry control, environmental supervision, etc., will promote explosive growing of internet-of-things applications, and hundreds of billions of devices will access the internet of things, so that everything will be intercommunicated indeed. Also a huge number of connected devices, and a variety of internet-of-things services will pose a new technology challenge to mobile communication.

As more new service demands are emerging constantly, there is a demand for higher performance of future mobile communication systems, e.g., a higher peak rate, a high user-experienced rate, a shorter delay, higher reliability, higher spectrum efficiency, high energy-consumption efficiency, etc., and there is a need of supporting a larger number of accessing subscribers, and an access to various types of services. In order to support a huge number of various connected UEs, and different types of services, flexible configuration of uplink and downlink resources has becomes a general technological development trend. Future system resources can be divided into different sub-bands for different services, and Transmission Time Intervals (TTIs) with different lengths can be defined in the sub-bands to satisfy a variety of service demands.

A drawback in the prior art lies in that there may be excessive energy consumption and wastes in such a mechanism in the existing LTE system that a UE with a short-TTI capability listens to a downlink control channel in each short TTI.

SUMMARY

Embodiments of the invention provide a method and apparatus for instructing a listen in a short transmission time interval, and a method and apparatus for listening in a short transmission time interval so as to address the problem of excessive energy consumption and wastes when the UE listens to a downlink control channel in each short TTI.

An embodiment of the invention provides a method for instructing a listen in a short TTI, the method including:

determining at a network side whether there is a short-TTI service; and instructing whether the UE needs to listen to a downlink control channel in a short TTI, according to whether there is a short-TTI service.

In an implementation, if there is a short-TTI service, instructing whether the UE needs to listen to a downlink control channel in a short TTI, in Downlink Control Information (DCI) transmitted in a legacy control region, or a dedicated instructing channel, or a Media Access Control (MAC) Control Element (CE); or implicitly instructing whether the UE needs to listen to a downlink control channel in a short TTI, according to whether transmitting DCI in a short TTI in the legacy control region.

In an implementation, instructing whether the UE needs to listen to a downlink control channel in a short TTI, includes instructing whether the UE needs to listen to a downlink control channel in a short TTI by carrying information in an ON/OFF information field; or instructing whether the UE needs to listen to a downlink control channel in a short TTI by instructing a quantity of short TTIs, and/or sequence numbers of short TTIs.

In an implementation, the DCI is a DCI capable of carrying a short-TTI control channel instruction.

In an implementation, the DCI carrying the short-TTI downlink control channel listening instruction is transmitted in a CSS in a legacy control region of a subframe or a USS in a legacy control region of a subframe; or the short-TTI downlink control channel listening instruction is transmitted in an MAC CE.

In an implementation, the short-TTI downlink control channel listening instruction is transmitted in the CSS of the legacy control region of the subframe to instruct a plurality of UEs; or the short-TTI downlink control channel listening instruction is transmitted in the USS of the legacy control region of the subframe to instruct a specific UE.

An embodiment of the invention provides a method for listening in a short TTI, the method including:

receiving at a UE side an instruction instructing whether or not to listen to a downlink control channel in a short TTI; and listening to a downlink control channel in a short TTI, in response to the instruction.

In an implementation, receiving at a UE side an instruction includes: receiving the instruction instructing whether or not to listen to a downlink control channel in a short TTI, in a DCI transmitted in a legacy control region, or a dedicated instructing channel, or an MAC CE; or deciding by the UE whether to listen to a downlink control channel in a short TTI, according to whether DCI of a short TTI is received in the legacy control region.

In an implementation, the instruction instructing whether or not to listen to a downlink control channel in a short TTI is received from instructed information carried in an ON/OFF information field; or the UE is instructed to or not to listen to a downlink control channel in a short TTI, by instructing a quantity of short TTIs and/or sequence numbers of short TTIs.

In an implementation, the DCI is a DCI capable of carrying a short-TTI control channel instruction.

In an implementation, the DCI carrying the short-TTI downlink control channel listening instruction is transmitted in a CSS in a legacy control region of a subframe or a USS in a legacy control region of a subframe; or the short-TTI downlink control channel listening instruction is transmitted in an MAC CE.

In an implementation, the short-TTI downlink control channel listening instruction is transmitted in the CSS in the legacy control region of the subframe to instruct a plurality of UEs; or the short-TTI downlink control channel listening instruction is transmitted in the USS in the legacy control region of the subframe to instruct a specific UE.

An embodiment of the invention provides an apparatus for instructing a listen in a short TTI, the apparatus including:

a service determining module configured to determine at a network side whether there is a short-TTI service; and an instructing module configured to instruct whether the UE needs to listen to a downlink control channel in a short TTI, according to whether there is a short-TTI service.

In an implementation, the instructing module is further configured, if there is a short-TTI service, to instruct whether the UE needs to listen to a downlink control channel in a short TTI, in a DCI transmitted in a legacy control region, or a dedicated instructing channel, or an MAC CE; or to instruct implicitly whether the UE needs to listen to a downlink control channel in a short TTI, by transmitting DCI in a short TTI in the legacy control region.

In an implementation, the instructing module is further configured to instruct whether the UE needs to listen to a downlink control channel in a short TTI, by carrying information in an ON/OFF information field; or to instruct whether the UE needs to listen to a downlink control channel in a short TTI, by instructing a quantity of short TTIs, and/or sequence numbers of short TTIs.

In an implementation, the DCI is a DCI capable of carrying a short-TTI control channel instruction.

In an implementation, the DCI carrying the short-TTI downlink control channel listening instruction is transmitted in a CSS in a legacy control region of a subframe or a USS in a legacy control region of a subframe; or the short-TTI downlink control channel listening instruction is transmitted in an MAC CE.

In an implementation, the instructing module is further configured to transmit the instruction in the CSS of the legacy control region of the subframe to instruct a plurality of UEs, or to transmit the instruction in the USS of the legacy control region of the subframe to instruct a specific UE.

An embodiment of the invention provides an apparatus for listening in a short TTI, the apparatus including:

a receiving module configured to receive at a UE side an instruction instructing whether or not to listen to a downlink control channel in a short TTI; and a listening module configured to listen to a downlink control channel in a short TTI, in response to the instruction.

In an implementation, the receiving module is further configured to receive the instruction instructing whether or not to listen to a downlink control channel in a short TTI, in DCI transmitted in a legacy control region, or a dedicated instructing channel, or an MAC CE; or to decide whether to listen to a downlink control channel in a short TTI, according to whether DCI of a short TTI is received in the legacy control region.

In an implementation, the receiving module is further configured to receive the instruction instructing whether or not to listen to a downlink control channel in a short TTI, from instructed information carried in an ON/OFF information field, or to receive the instruction instructing whether or not to listen to a downlink control channel in a short TTI, from a quantity number of short TTIs and/or sequence numbers of short TTIs.

In an implementation, the DCI is a DCI capable of carrying a short-TTI control channel instruction.

In an implementation, the receiving module is further configured to receive the DCI, carrying the short-TTI downlink control channel listening instruction, transmitted in a CSS in a legacy control region of a subframe or a USS in a legacy control region of a subframe, or to receive the short-TTI downlink control channel listening instruction transmitted in an MAC CE.

In an implementation, the short-TTI downlink control channel listening instruction is transmitted in the CSS in the legacy control region of the subframe to instruct a plurality of UEs, or the short-TTI downlink control channel listening instruction is transmitted in the USS in the legacy control region of the subframe to instruct a specific UE.

Advantageous effects of the invention are as follows.

In the technical solutions according to the embodiments of the invention, the network side instructs whether the UE needs to listen in a short TTI, according to whether there is a short-TTI service, and the UE side listens in a short TTI in response to the instruction.

Since the UE side listens in a short TTI in response to the instruction of the network side, the UE with a short-TTI capability will only listen when there is a short-TTI service instead of listening to a downlink control channel in each short TTI, so energy will not be excessively consumed and wasted.

BRIEF DESCRIPTION OF THE DRAWINGS

The drawings to be described below are intended to provide further understanding of the invention, and constitute a part of the specification, and the exemplary embodiments of the invention, and the description thereof are intended to set forth the invention, but not to limit the invention unduly. In the drawings.

DETAILED DESCRIPTION OF THE EMBODIMENTS

The inventors have identified followings during making of the invention.

Figure 1:
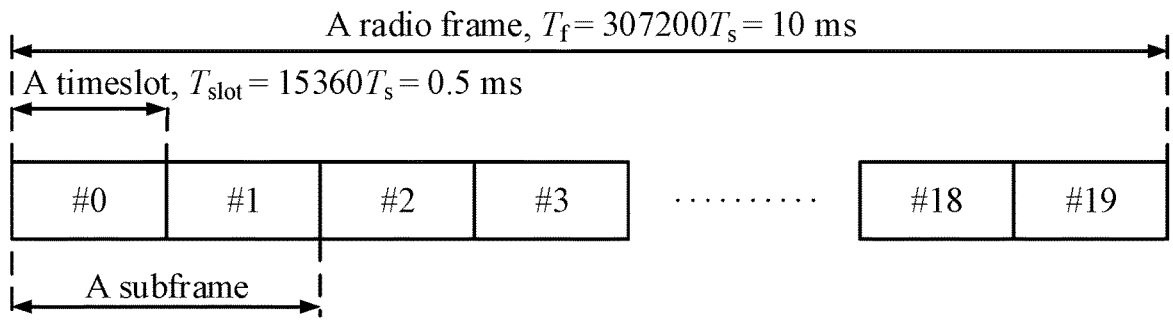
FIG. 1 is a schematic diagram of a frame structure type 1 for an LTE FDD system according to an embodiment of the invention.

FIG. 1 is a schematic diagram of the frame structure type 1 for the LTE FDD system, that is, FIG. 1 illustrates a schematic structural diagram of the Frame Structure Type 1 (FS1) for the Long Term Evolution (LTE) Frequency Division Duplex (FDD) system in the prior art. In the FDD system, there are different carrier frequencies for uplink and downlink transmission, and the same frame structure for both uplink and downlink transmission. Over each carrier, a radio frame with the length of 10 ms includes ten 1 ms subframes, and each subframe includes two timeslots with the length of 0.5 ms. There is a TTI length of time, 1 ms, for uplink and downlink data transmission.

Figure 2:
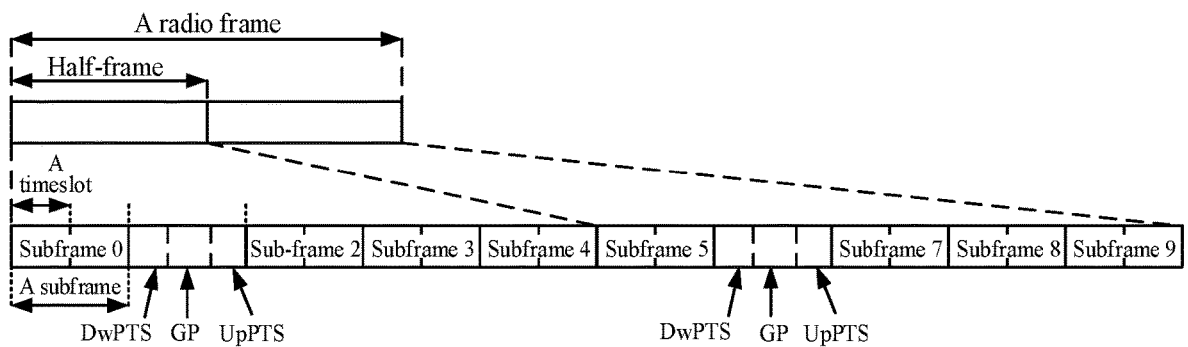
FIG. 2 is a schematic diagram of a frame structure type 2 for an LTE FDD system according to an embodiment of the invention.

FIG. 2 is a schematic diagram of the frame structure type 2 for the LTE TDD system, that is, FIG. 2 illustrates a schematic structural diagram of the Frame Structure Type 1 (FS2) for the LTE Time Division Duplex (TDD) system in the prior art. In the TDD system, there are different subframes or different timeslots, at the same frequency, for uplink and downlink transmission. In the FS2, each 10 ms radio frame includes two 5 ms half-frames, and each half-frame includes five subframes with the length of 1 ms. The subframes in the FS2 are categorized into categories: downlink subframes, uplink subframes, and special subframes, and each special subframe includes three components of a Downlink Pilot Time Slot (DwPTS), a Guard Period (GP), and an Uplink Pilot Time Slot (UpPTS), where only a downlink pilot, downlink service data, and downlink control signaling can be transmitted in the DwPTS, no signal is transmitted in the GP, and only a random access and a Sounding Reference Signal (SRS) can be transmitted, but neither uplink service nor uplink control information can be transmitted in the UpPTS. Each half-frame includes at least one downlink subframe, at least one uplink subframe, and at most one special subframe. Seven uplink-downlink subframe configurations supported in the FS2 are as depicted in Table 1.

TABLE 1

| Uplink-downlink configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the legacy LTE system, a UE shall attempt to listen to a downlink control channel in each subframe in an ON stage in a Discontinuous Reception (DRX) periodicity no matter whether the UE is scheduled by an eNB in the subframe. If the UE receives downlink control information related thereto successfully, then the UE will transmit or receive data according to scheduling information in the downlink control information. If the UE does not receive any downlink control information related thereto, then the UE will determine that the eNB side has not allocated any resource for the UE to transmit data.

A drawback in the prior art lies in that there is a fixed TTI length of 1 ms in the existing LTE system, one or more Physical Downlink Control Channels (PDCCHs) or enhanced Physical Downlink Control Channels (ePDCCHs) are transmitted in the first N Orthogonal Frequency Division Multiplexing (OFDM) symbols in each TTI, or in a group of Physical Resource Block (PRB) pairs in a data region, and a User Equipment (UE) detects a Cell-specific Search Space (CSS) or a UE-specific Search Space (USS) blindly for its own PDCCH or ePDCCH including information desirable thereto. Downlink Control Information (DCI) transmitted in the PDCCH or the ePDCCH includes scheduling information, and the UE can transmit or receive data upon reception of the DCI. For a short TTI, the length of the short TTI is less than 1 ms, and there may be a plurality of short TTIs in a subframe. The UE may have data to be transmitted in a short TTI in each subframe. If the UE with a short-TTI capability listens to a downlink control channel in each short TTI, then energy may be excessively consumed and wasted.

Apparently as the mobility technologies, future mobile communication system shall provide a shorter network delay, and support more abundant types of services. A transmission delay can be significantly shortened due to the introduction of a short TTI generally applicable to scenarios and types of services for which a short delay is required. Since the length of a short TTI is less than a subframe, then there may be a plurality of short TTIs in a subframe. If a UE with a short-TTI transmission capability receives a downlink control channel in each short TTI, then energy may be excessively consumed at the UE side. However there has been absent so far a definite solution to instructing a UE to stop receiving a downlink control channel in a short TTI in a related subframe when there is no service to be transmitted in a short TTI. In view of this, in the technical solutions according to the embodiments of the invention, an eNB instructs a UE with a short-TTI capability to or not to listen to a downlink control channel in a short TTI, according to a service condition in a system so that the UE can listen as needed in reality for a short-TTI service to thereby avoid energy from being excessively consumed at the UE side. The embodiments of the invention will be described below with reference to the drawings.

In the following description, implementations at the UE and eNB sides will be respectively, where an instructing process at the eNB side, and a listening process at the UE side will be described respectively, and then implementations in which both of them cooperate with each other will be exemplified for better understanding of the implementations of the solutions according to the embodiments of the invention. Such a description will not suggest that both of them must cooperate with each other in an implementation, or they must operate separately in an implementation, but in fact, when the UE and the eNB operate separately in an implementation, respective problems at the UE and eNB sides will be addressed, and when both of them cooperate with each other in an implementation, there will be a better technical effect.

In the following description, generally an implementation at the UE side will be described, and since an implementation at the eNB side matches with the implementation at the UE side, those skilled in the art shall know the implementation at the eNB side from the implementation at the UE side.

Figure 3:
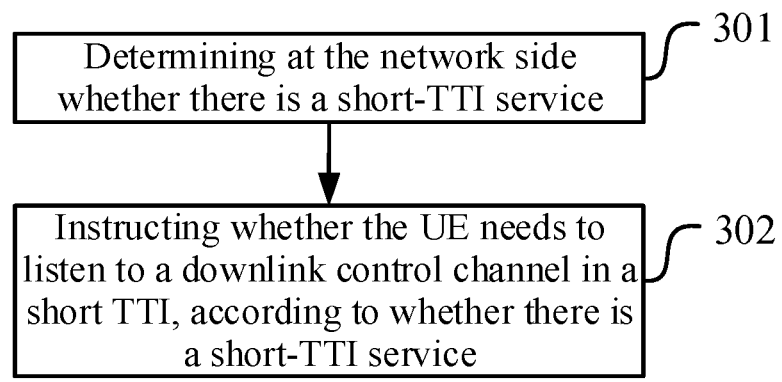
FIG. 3 is a schematic flow chart of an implementation of a method for instructing a UE to listen in a short TTI according to an embodiment of the invention.

FIG. 3 is a schematic flow chart of an implementation of a method for instructing a UE to listen in a short TTI according to an embodiment of the invention, and as illustrated, the method can include the following steps:

the step S301 is to determine at the network side whether there is a short-TTI service; and the step S302 is to instruct whether the UE needs to listen to a downlink control channel in a short TTI, according to whether there is a short-TTI service.

Particularly, an eNB determines whether there is a short-TTI service, according to a network service condition, and instructs whether the UE needs to listen to a downlink control channel in a short TTI, according to whether there is a short-TTI service.

In an implementation, if there is a short-TTI service, the eNB instructs whether the UE needs to listen to a downlink control channel in a short TTI, in DCI transmitted in a legacy control region, or a dedicated instructing channel, or an MAC CE.

Particularly, if there is a short-TTI service, the eNB will transmit a short-TTI indicator in DCI in the legacy control region, or a dedicated instructing channel, or a Media Access Control (MAC) Control Element (CE).

Alternatively, the eNB instructs the UE implicitly to or not to listen to a downlink control channel in a short TTI, by transmitting DCI of a short TTI in the legacy control region.

Particularly, the eNB transmits DCI of a short TTI in the legacy control region, according to whether there is a short-TTI service, and when the UE receives the DCI of a short TTI in the legacy control region, the UE will listen to a downlink control channel in a short TTI in the subframe; and when the UE does not receive any DCI of a short TTI in the legacy control region, then the UE will not listen to any downlink control channel in a short TTI in the subframe.

In an implementation, the UE can be instructed to or not to listen to a downlink control channel in a short TTI, by carrying an indicator in an ON/OFF information field.

Particularly, the indicator can be represented in a 1-bit ON/OFF information field, and for example, the ON/OFF indicator can be transmitted in a legacy control region of every N subframes, where 1 instructs that listening to a short PDCCH (sPDCCH) is enabled, and 0 instructs that listening to sPDCCH is disabled.

Alternatively, the eNB instructs the UE implicitly to or not to listen to a downlink control channel in a short TTI, by instructing the number of short TTIs and/or the sequence numbers of short TTIs.

Particularly, the indicator can instruct the number of short TTIs (sTTIs) in which the UE is to listen to a downlink control channel in a short TTI, that is, the indicator can instruct the number of sTTIs for listening, and/or the indicator can instruct the particular sequence numbers of sTTIs for listening, so that the UE is instructed to or not to listen to a downlink control channel in a short TTI.

In a particular implementation, there may be at least two particular implementations of a particular design of the information field.

1. Only ON/OFF is instructed, and for example, if there are seven sTTIs in a subframe, the UE will listen to an sPDCCH in the seven sTTIs upon reception of ON signaling, or the UE will not listen to an sPDCCH in each sTTI upon reception of ON signaling until OFF signaling is received.

2. The number or the sequence numbers of sTTIs is or are instructed, and the particular number of short TTIs for listening is instructed in the DCI; and for example, there are seven short TTIs in a subframe, and three short TTIs for listening are instructed in the DCI, the UE will only listen in the first three short TTIs.

In an implementation, the DCI is DCI capable of carrying a short-TTI control channel instruction.

In an implementation, the DCI carrying a short-TTI downlink control channel listening instruction is transmitted in a CSS or a USS in a legacy control region of a subframe; or the short-TTI downlink control channel listening instruction is transmitted in an MAC CE.

Particularly, the instruction is a short-TTI downlink control channel listening instruction carried in the MAC CE to instruct whether the UE needs to listen to a downlink control channel in a short TTI, and the short-TTI downlink control channel listening instruction is transmitted in an MAC CE of every N subframes. Transmission in a CSS or a USS will be further described below.

In a particular implementation, the short-TTI downlink control channel listening instruction is transmitted in the CSS in the legacy control region of the subframe to instruct a plurality of UEs; or the short-TTI downlink control channel listening instruction is transmitted in a USS in the legacy control region of the subframe to instruct to instruct a specific UE.

Particularly, the ON/OFF indicator is transmitted in the CSS or a USS in the legacy control region of the subframe, and the short-TTI downlink control channel listening instruction is transmitted in the CSS of the legacy control region of the subframe, and thus applicable to the UEs receiving the instruction.

The DCI carrying the short-TTI downlink control channel listening instruction can be included in a newly defined DCI format, or can be a short-TTI downlink control channel listening instruction field added to the existing DCI format.

The short-TTI downlink control channel listening instruction is transmitted in a USS in the legacy control region of the subframe, and thus only applicable to the UE corresponding to the USS, and the DCI carrying the instruction can be included in a newly defined DCI format, or can be a short-TTI downlink control channel listening instruction field added to the existing DCI format.

Figure 4:
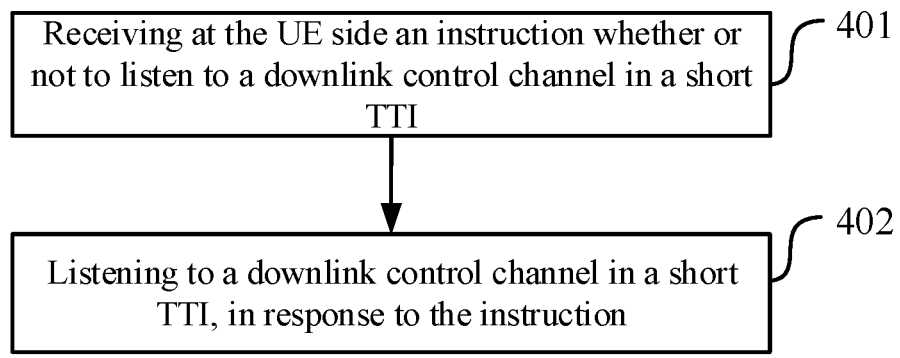
FIG. 4 is a schematic flow chart of an implementation of a method for listening in a short TTI at the UE side according to an embodiment of the invention.

FIG. 4 is a schematic flow chart of an implementation of a method for listening in a short TTI at the UE side, and as illustrated, the method can include the following steps:

the step 401 is to receive at the UE side an instruction to or not to listen to a downlink control channel in a short TTI; and the step 402 is to listen to a downlink control channel in a short TTI, in response to the instruction.

Particularly, a UE with a short-TTI capability decides whether to listen to a downlink control channel in a short TTI, according to the instruction of an eNB.

In an implementation, the UE receives the instruction instructing whether or not to listen to a downlink control channel in a short TTI, in DCI transmitted in a legacy control region, or a dedicated instructing channel, or an MAC CE.

Particularly, the instruction is carried in DCI of a short TTI transmitted in the legacy control region of a subframe, or carried in other DCI transmitted in the legacy control region.

Alternatively, the UE decides whether to listen to a downlink control channel in a short TTI, according to whether DCI of a short TTI is received in the legacy control region.

Particularly, the short-TTI control channel listening indicator can be signaled implicitly to the UE. When the UE receives the DCI of a short TTI in the legacy control region, the UE will listen to a downlink control channel in a short TTI in the subframe; and when the UE does not receive any DCI of a short TTI in the legacy control region, then the UE will not listen to any downlink control channel in a short TTI in the subframe.

Stated otherwise, if the UE with a short-TTI capability does not receive the instruction, then the UE will not listen to any downlink control channel in a short TTI by default; or if the UE with a short-TTI capability does not receive the instruction, then the UE will listen to a downlink control channel in a short TTI by default.

In an implementation, the UE is instructed to or not to listen to a downlink control channel in a short TTI by carrying an indicator in an ON/OFF information field.

Particularly, the indicator can be represented in an ON/OFF information field including some bit, and for example, the ON/OFF indicator is transmitted in a legacy control region of every N subframes, where 1 instructs that listening to an sPDCCH is enabled, that is, the UE will listen to a downlink control channel in a short TTI in the subframe upon reception of the ON indicator; and 0 instructs that listening to sPDCCH is disabled, that is, the UE will not listen to any downlink control channel in a short TTI in the subframe upon reception of the OFF indicator.

Alternatively, the UE is instructed to or not to listen to a downlink control channel in a short TTI by instructing the number of short TTIs and/or the sequence numbers of short TTIs.

Particularly, the indicator can instruct the number of sTTIs in which the UE is to listen to a downlink control channel in a short TTI, that is, the indicator can instruct the number of sTTIs for listening, and/or the indicator can instruct the particular sequence numbers of sTTIs for listening, so that the UE is instructed to or not to listen to a downlink control channel in a short TTI.

The indicator is transmitted in a CSS or a USS in the legacy control region of the subframe.

If the indicator is transmitted in a CSS in the legacy control region of the subframe, then it will be applicable to all the UEs with a short-TTI capability.

The DCI carrying the short-TTI downlink control channel listening instruction is applicable to a higher-layer configured group of UEs, and all the UEs in the group can parse the DCI. The DCI includes the short-TTI downlink control channel listening instruction for all the UEs in the group. The listening instruction is configured per UE, and for example, if there are X UEs in the group, and there are Z bits of the short-TTI downlink control channel listening instruction of each UE, then the DCI will include an information field of X*Z bits to instruct a downlink control channel listening position of each UE; and the DCI carrying the instruction is included in a newly defined DCI format applicable to an sTTI, or in the existing DCI format (to which a short-TTI downlink control channel listening instruction field is added).

Alternatively, the DCI carrying the short-TTI downlink control channel listening instruction is common, that is, it is applicable to all the UEs, and all the UEs can parse the DCI in the CSS. For example, if there are Z bits of the short-TTI downlink control channel listening instruction of each UE, then the DCI will include a Z-bit information field to instruct a downlink control channel listening position of each UE. All the UEs receiving the DCI will listen to a downlink control channel in a short TTI at the short TTI position instructed in the DCI. The DCI carrying the instruction is included in a newly defined DCI format applicable to an sTTI, or in the existing DCI format (to which a short-TTI downlink control channel listening instruction field is added).

If the short-TTI downlink control channel listening instruction is transmitted in a USS in the legacy control region of the subframe, it will be only applicable to the UE corresponding to the USS; and the DCI is a newly defined DCI format for scheduling in a short TTI, and the UE configured with the USS can parse the DCI for the short-TTI downlink control channel listening instruction. The instruction instructs positional information for listening to a downlink control channel in a short TTI.

Alternatively, the DCI is included in the existing LTE DCI format, and positional information for listening to a downlink control channel in a short TTI is added to the DCI format. The UE configured with the USS can parse the DCI for the positional information for listening to a downlink control channel in a short TTI.

In an implementation, the DCI is DCI capable of carrying the short-TTI control channel instruction.

In an implementation, the DCI carrying the short-TTI downlink control channel listening instruction is transmitted in a CSS or a USS in the legacy control region of the subframe; or the short-TTI downlink control channel listening instruction is transmitted in an MAC CE.

Particularly, the instruction is a short-TTI downlink control channel listening instruction carried in the MAC CE to instruct whether the UE needs to receive a downlink control channel in a short TTI, and the short-TTI downlink control channel listening instruction is transmitted in an MAC CE of every N subframes. The UE will listen to a downlink control channel in a short TTI in the subframe upon reception of the ON indicator; and the UE will not listen to any downlink control channel in a short TTI in the subframe upon reception of the OFF indicator. Transmission in a CSS or a USS will be further described below.

In a particular implementation, the short-TTI downlink control channel listening instruction is transmitted in the CSS in the legacy control region of the subframe to instruct a plurality of UEs; or the short-TTI downlink control channel listening instruction is transmitted in a USS in the legacy control region of the subframe to instruct a specific UE.

Particularly, the ON/OFF indicator is transmitted in the CSS or a USS in the legacy control region of the subframe.

If the short-TTI downlink control channel listening instruction is transmitted in the CSS of the legacy control region of the subframe, then it will be applicable to all the UEs receiving the instruction.

The DCI carrying the short-TTI downlink control channel listening instruction can be included in a newly defined DCI format applicable to a sTTI, or can be the existing DCI format (to which a short-TTI downlink control channel listening instruction field is added).

The DCI carrying the short-TTI downlink control channel listening instruction is applicable to a group of UEs, and all the UEs in the group can parse the DCI. The DCI includes the short-TTI downlink control channel listening instruction for the UEs. The listening instruction is configured per UE, and for example, if there are X UEs in the group, then the DCI will include an X-bit information field to instruct an sPDCCH-enabled or disabled condition of each UE; or the DCI carrying the short-TTI downlink control channel listening instruction is applicable to all the UEs, and all the UEs can parse the DCI in the CSS, so the DCI will include an information field of only one bit to instruct the UEs to or not to listen to a downlink control channel in a short TTI.

If the short-TTI downlink control channel listening instruction is transmitted in a USS in the legacy control region of the subframe, then it will be only applicable to the UE corresponding to the USS; and the DCI is a newly defined DCI format for scheduling in a short TTI, and the UE configured with the USS can parse the DCI for the short-TTI downlink control channel listening instruction.

The DCI is included in the existing LTE DCI format, and a short-TTI downlink control channel listening instruction field is added to the DCI format. The UE configured with the USS can parse the DCI for the positional information for listening to a downlink control channel in a short TTI.

Examples will be described below.

First Embodiment

For example, the UE has a short-TTI capability. The eNB transmits slow DCI in a CSS in a legacy control region of a subframe, where the DCI carries sPDCCH listening-ON/OFF information. For example, an M-bit information field in the slow DCI instructs the ON/OFF information. The slow DCI transmitted in the CSS is common information applicable to all the UEs with a short-TTI capability. The slow DCI is DCI in a short TTI transmitted in the legacy control region, and transmitted for each subframe at most once. The UE with a short-TTI capability obtains scheduling information in a short TTI according to the DCI in a short TTI transmitted in the legacy control region of the subframe, and DCI in a short TTI transmitted in a control region of each sTTI.

There may be at least the following two schemes of the ON/OFF information carried in the slow DCI transmitted in a CSS in the legacy control region of the subframe without any limitation thereto.

In a first scheme, the ON/OFF information is represented as 1-bit information, where 1 instructs that listening to a sPDCCH is enabled, and 0 instructs that listening to sPDCCH is disabled.

If the UE with a sTTI capability receives an ON indicator, then the UE will start to listen to a downlink control channel in a short TTI and not stop listening until an OFF indicator is received. The ON/OFF information can be transmitted once for N subframes, where N is a positive integer more than 1. The DCI carrying the ON/OFF indicator is higher-layer configured DCI applicable to a group of UEs, and all the UEs in the group can parse the DCI. The DCI includes short-TTI control channel listening ON/OFF information of the UEs. The ON/OFF information is configured per UE, and for example, if there are X UEs in the group, then the DCI will include an X-bit information field to instruct sPDCCH-disabled or enabled conditions of the respective UEs; or the DCI carrying the ON/OFF indicator is common, that is, applicable to all the UEs, and includes an information field of only one bit to instruct whether to listen to a downlink control channel in a short TTI.

In a second scheme, a sPDCCH listening instructing field in the slow DCI instructs that the UE is to listen to a downlink control channel in a short TTI in M consecutive or discrete short TTIs.

For example, if the number of short TTIs for listening is instructed as P, all the UEs with a short-TTI capability will listen in P number of consecutive short TTIs since they receive slow DCI. In another example, if the particular sequence numbers of short TTIs for listening are instructed, all the UEs with a short-TTI capability will listen to a sPDCCH in the Q number of specific short TTIs according to the sPDCCH listening instruction, where both P and Q are integers greater than or equal to 1. The DCI carrying the ON/OFF indicator is higher-layer configured DCI applicable to a group of UEs, and all the UEs in the group can parse the DCI. The DCI includes short-TTI downlink control channel listening information of all the UEs in the group. The listening information is configured per UE, and for example, if there are X number of UEs in the group, and the short-TTI downlink control channel listening information of each UE is to be represented as Z bits, the DCI will include an information field of X*Z bits to instruct downlink control channel listening positions of the respective UEs; or the DCI carrying the short-TTI downlink control channel instruction is scrambled using a short-TTI related Radio Network Temporary Identifier (RNTI), and all the UE configured with the RNTI can parse the DCI using the RNTI. The DCI is common, that is, applicable to all the UEs. For example, if the short-TTI downlink control channel instruction of each UE is represented as Z bits, the DCI will include a Z-bit information field to instruct downlink control channel listening positions of the respective UEs. All the UEs receiving the DCI will listen to a downlink control channel in a short TTI at the short-TTI positions instructed in the DCI.

In a particular implementation, if the UE with a short-TTI capability has not received the instruction, it will not listen to any downlink control channel in a short TTI by default; or if the UE with a short-TTI capability has not received the instruction, it will listen to a downlink control channel in a short TTI by default.

In a particular implementation, the sPDCCH listening instruction can alternatively be carried in another channel.

Second Embodiment for example, if the UE has a short-TTI capability. The eNB transmits slow DCI in a USS in a legacy control region of a subframe, where the DCI carries sPDCCH listening-ON/OFF information. For example, the ON/OFF information is represented as M-bit information. The slow DCI transmitted in the USS is UE-specific information applicable to a specific UE with a short-TTI capability. The slow DCI is DCI in a short TTI transmitted in the legacy control region, and transmitted once for every Z number of subframes. The UE with a short-TTI capability obtains scheduling information in a short TTI according to the DCI in a short TTI transmitted in the legacy control region of the subframe, and DCI in a short TTI transmitted in a control region of each sTTI.

There may be at least the following two schemes of the ON/OFF information carried in the slow DCI transmitted in the USS in the legacy control region of the subframe without any limitation thereto.

In a first scheme, the ON/OFF information is represented as a 1-bit information field in the slow DCI, where 1 instructs that listening to a sPDCCH is enabled, and 0 instructs that listening to sPDCCH is disabled.

If the UE with a sTTI capability receives an ON indicator, the UE will start to listen to a downlink control channel in a short TTI, and stop listening to a downlink control channel in a short TTI until an OFF indicator is received. The ON/OFF information can be transmitted once for N number of subframes, where N is a positive integer more than 1. The indicator is applicable to the UE with a short-TTI capability corresponding to the USS. The DCI is included in a newly defined DCI format for scheduling in a short TTI. The DCI includes short-TTI downlink control channel listening positional information. Alternatively the DCI is included in the existing LTE DCI format, and short-TTI downlink control channel listening positional information is added to the DCI format. The UE can detect the configured USS for the DCI, and parse the DCI for the ON/OFF information therein.

In a second scheme, a sPDCCH listening instructing field in the slow DCI instructs that the UE is to listen to a downlink control channel in a short TTI in M number of consecutive or discrete short TTIs.

For example, if the number of short TTIs for listening is instructed as P, all the UEs with a short-TTI capability will listen in P number of consecutive short TTIs since they receive slow DCI. In another example, if the particular sequence numbers of short TTIs for listening are instructed, all the UEs with a short-TTI capability will listen to a sPDCCH in the Q number of specific short TTIs according to the sPDCCH listening instruction, where all of M, P and Q are integers greater than or equal to 1. The DCI is included in a newly defined DCI format for scheduling in a short TTI. The DCI includes short-TTI downlink control channel listening positional information. Alternatively the DCI is included in the existing LTE DCI format, and short-TTI downlink control channel listening positional information is added to the DCI format. The UE can detect the configured USS for the DCI, and parse the DCI for the ON/OFF information therein.

In a particular implementation, if the UE with a short-TTI capability has not received the instruction, it will not listen to any downlink control channel in a short TTI by default; or if the UE with a short-TTI capability has not received the instruction, it will listen to a downlink control channel in a short TTI by default.

In a particular implementation, the sPDCCH listening instruction can alternatively be carried in another channel.

Third Embodiment

For example, the UE has a short-TTI capability. The sPDCCH ON/OFF information is carried in an MAC CE of a subframe.

There may be the following particular implementations of the indicator without any limitation thereto:

the ON/OFF indicator is transmitted in an MAC CE of every N number of subframes. If the UE with a short-TTI capability receives the ON indicator, the UE will listen to an sPDCCH in a short TTI in the subframe; and if the UE with a short-TTI capability receives the OFF indicator, the UE will not listen to any sPDCCH in a short TTI in the subframe, where N is an integer greater than or equal to 1.

In a particular implementation, alternatively when the UE with a short-TTI capability has not received the indicator, then a fallback operation of the UE will be defined. For example, if the UE has not received the indicator, then the UE will not listen to any downlink control channel in a short TTI in the subframe; or if the UE has not received the indicator, then the UE will listen to a downlink control channel in a short TTI in the subframe.

Fourth Embodiment

For example, the UE has a short-TTI capability, and can decide with the eNB implicitly as predefined whether to listen to a downlink control channel in a short TTI in the subframe. Data in a short TTI are scheduled with 2-level DCI, where slow DCI is transmitted in a legacy control region of a subframe, and transmitted in each subframe at most once, and fast DCI is transmitted in a control region of each sTTI.

When the eNB side transmits slow DCI, and the UE with a short-TTI capability receives the slow DCI successfully, UE listens to a downlink control channel in a short TTI in the subframe; and if the UE has not received the slow DCI, the UE will not listen to any downlink control channel in a short TTI in the subframe.

Only a possible application scenario has been described in this embodiment, but a slow DCI can be applicable to a plurality of subframes, and of course, the particular transmission position of the slow DCI will not be limited to any particular transmission position; and the slow DCI can be transmitted in a CSS or a USS in a legacy control region of the subframe, or can be transmitted at another position.

Based upon the same inventive idea, embodiments of the invention further provide an apparatus for instructing a UE to listen in a short TTI, and an apparatus for listening in a short TTI. Since these apparatuses address the problem under a similar principle to the method for instructing a UE to listen in a short TTI, and the method for listening in a short TTI, reference can be made to the implementations of the methods for implementations of these apparatuses, and a repeated description thereof will be omitted here.

Figure 5:
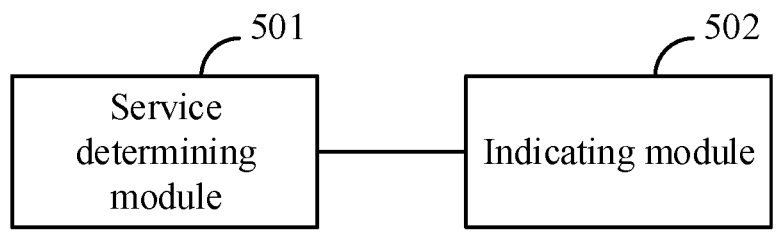
FIG. 5 is a schematic structural diagram of an apparatus for instructing a UE to listen in a short TTI at the network side according to an embodiment of the invention.

FIG. 5 is a schematic structural diagram of an apparatus for instructing a UE to listen in a short TTI, and as illustrated, the apparatus can include:

a service determining module 501 is configured to determine at the network side whether there is a short-TTI service; and an instructing module 502 is configured to instruct whether the UE needs to listen to a downlink control channel in a short TTI, according to whether there is a short-TTI service.

In an implementation, the instructing module is further configured, if there is a short-TTI service, to instruct whether the UE needs to listen to a downlink control channel in a short TTI, in DCI transmitted in a legacy control region, or a dedicated instructing channel, or an MAC CE; or to instruct implicitly whether the UE needs to listen to a downlink control channel in a short TTI, by transmitting DCI in a short TTI in the legacy control region.

In an implementation, the instructing module is further configured to instruct whether the UE needs to listen to a downlink control channel in a short TTI, by carrying information in an ON/OFF information field; or to instruct whether the UE needs to listen to a downlink control channel in a short TTI, by instructing the number of short TTIs, and/or the sequence numbers of short TTIs.

In an implementation, the DCI is DCI capable of carrying a short-TTI control channel instruction.

In an implementation, the DCI carrying the short-TTI downlink control channel listening instruction is transmitted in a CSS or a USS in a legacy control region of a subframe; or the short-TTI downlink control channel listening instruction is transmitted in an MAC CE.

In an implementation, the instructing module is further configured to transmit the instruction in the CSS of the legacy control region of the subframe to instruct a plurality of UEs, or to transmit the instruction in the USS of the legacy control region of the subframe to instruct a specific UE.

Figure 6:
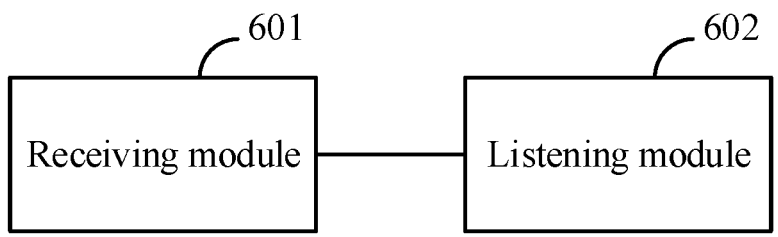
FIG. 6 is a schematic structural diagram of an apparatus for listening in a short TTI at the UE side according to an embodiment of the invention.

FIG. 6 is a schematic structural diagram of an apparatus for listening in a short TTI, and as illustrated, the apparatus can include:

a receiving module 601 is configured to receive at the UE side an instruction to or not to listen to a downlink control channel in a short TTI; and a listening module 602 is configured to listen to a downlink control channel in a short TTI, in response to the instruction.

In an implementation, the receiving module is further configured to receive the instruction instructing whether or not to listen to a downlink control channel in a short TTI, in DCI transmitted in a legacy control region, or a dedicated instructing channel, or an MAC CE; or to decide whether to listen to a downlink control channel in a short TTI, according to whether DCI of a short TTI is received in the legacy control region.

In an implementation, the receiving module is further configured to receive the instruction instructing whether or not to listen to a downlink control channel in a short TTI, from instructed information carried in an ON/OFF information field, or to receive the instruction instructing whether or not to listen to a downlink control channel in a short TTI, from the instructed number of short TTIs and/or sequence numbers of short TTIs.

In an implementation, the DCI is DCI capable of carrying a short-TTI control channel instruction.

In an implementation, the receiving module is further configured to receive the DCI, carrying the short-TTI downlink control channel listening instruction, transmitted in a CSS or a USS in a legacy control region of a subframe, or to receive the short-TTI downlink control channel listening instruction transmitted in an MAC CE.

In an implementation, the short-TTI downlink control channel listening instruction is transmitted in the CSS in the legacy control region of the subframe to instruct a plurality of UEs, or the short-TTI downlink control channel listening instruction is transmitted in the USS in the legacy control region of the subframe to instruct a specific UE.

For the sake of a convenient description, the respective components of the apparatuses above have been functionally described respectively as respective modules or units. Of course, the functions of the respective modules or units can be performed in the same one or more pieces of software or hardware in an implementation of the invention.

The technical solutions according to the embodiments of the invention can be embodied as follows.

Figure 7:
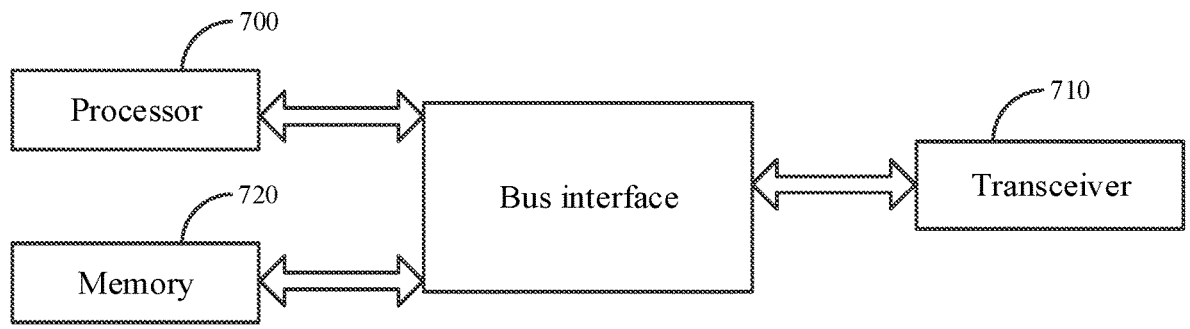
FIG. 7 is a schematic structural diagram of an eNB according to an embodiment of the invention.

FIG. 7 is a schematic structural diagram of an eNB according to an embodiment of the invention, and as illustrated, the eNB can include:

a processor 700 is configured to read and execute program in a memory 720:

to determine at the network side whether there is a short-TTI service; and a transceiver 710 is configured to receive and transmit data under the control of the processor 700:

to instruct whether the UE needs to listen to a downlink control channel in a short TTI, according to whether there is a short-TTI service.

In an implementation, the processor is further configured, if there is a short-TTI service, to instruct whether the UE needs to listen to a downlink control channel in a short TTI, in DCI transmitted in a legacy control region, or a dedicated instructing channel, or an MAC CE; or to instruct implicitly whether the UE needs to listen to a downlink control channel in a short TTI, by transmitting DCI in a short TTI in the legacy control region.

In an implementation, the processor is further configured to instruct whether the UE needs to listen to a downlink control channel in a short TTI, by carrying information in an ON/OFF information field; or to instruct whether the UE needs to listen to a downlink control channel in a short TTI, by instructing the number of short TTIs, and/or the sequence numbers of short TTIs.

In an implementation, the DCI is DCI capable of carrying a short-TTI control channel instruction.

In an implementation, the DCI carrying the short-TTI downlink control channel listening instruction is transmitted in a CSS or a USS in a legacy control region of a subframe; or the short-TTI downlink control channel listening instruction is transmitted in an MAC CE.

In an implementation, the processor is further configured to transmit the instruction in the CSS of the legacy control region of the subframe to instruct a plurality of UEs; or to transmit the instruction in the USS of the legacy control region of the subframe to instruct a specific UE.

Here in FIG. 7, the bus architecture can include any number of interconnecting buses and bridges to particularly link together various circuits including one or more processors represented by the processor 700, and one or more memories represented by the memory 720. The bus architecture can further link together various other circuits, e.g., a peripheral device, a manostat, a power management circuit, etc., all of which are well known in the art, so a further description thereof will be omitted in this context. The bus interface serves as an interface. The transceiver 710 can be a number of elements, e.g., a transmitter and a receiver, which are units for communication with various other devices over a transmission medium. The processor 700 is responsible for managing the bus architecture and performing normal processes, and the memory 720 can store data for use by the processor 700 in performing the operations.

Figure 8:
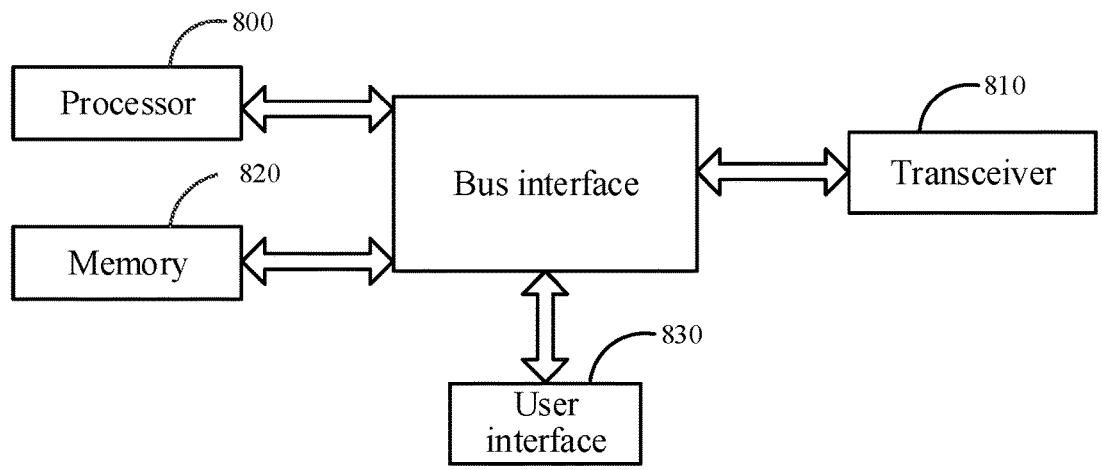
FIG. 8 is a schematic structural diagram of a UE according to an embodiment of the invention.

FIG. 8 is a schematic structural diagram of a UE according to an embodiment of the invention, and as illustrated, the UE can include:

a processor 800 is configured to read and execute program in a memory 720:

to listen to a downlink control channel in a short TTI, in response to an instruction to or not to listen to a downlink control channel in a short TT.

a transceiver 810 is configured to receive and transmit data under the control of the processor 800:

to receive the instruction at the UE side.

In an implementation, the processor is further configured to receive the instruction instructing whether or not to listen to a downlink control channel in a short TTI, in DCI transmitted in a legacy control region, or a dedicated instructing channel, or an MAC CE; or to decide whether to listen to a downlink control channel in a short TTI, according to whether DCI of a short TTI is received in the legacy control region.

In an implementation, the processor is further configured to receive the instruction instructing whether or not to listen to a downlink control channel in a short TTI, from instructed information carried in an ON/OFF information field; or to receive the instruction instructing whether or not to listen to a downlink control channel in a short TTI, from the instructed number of short TTIs and/or sequence numbers of short TTIs.

In an implementation, the DCI is DCI capable of carrying a short-TTI control channel instruction.

In an implementation, the processor is further configured to receive the DCI, carrying the short-TTI downlink control channel listening instruction, transmitted in a CSS or a USS in a legacy control region of a subframe; or to receive the short-TTI downlink control channel listening instruction transmitted in an MAC CE.

In an implementation, the short-TTI downlink control channel listening instruction is transmitted in the CSS in the legacy control region of the subframe to instruct a plurality of UEs; or the short-TTI downlink control channel listening instruction is transmitted in the USS in the legacy control region of the subframe to instruct a specific UE.

Here in FIG. 8, the bus architecture can include any number of interconnecting buses and bridges to particularly link together various circuits including one or more processors represented by the processor 800, and one or more memories represented by the memory 820. The bus architecture can further link together various other circuits, e.g., a peripheral device, a manostat, a power management circuit, etc., all of which are well known in the art, so a further description thereof will be omitted in this context. The bus interface serves as an interface. The transceiver 810 can be a number of elements, e.g., a transmitter and a receiver, which are units for communication with various other devices over a transmission medium. For different user equipments, the user interface 830 can also be an interface via which devices are connected internally and externally as needed, and the connected devices include but will not be limited to a keypad, a monitor, a speaker, a microphone, a joystick, etc.

The processor 800 is responsible for managing the bus architecture and performing normal processes, and the memory 820 can store data for use by the processor 800 in performing the operations.

In summary, in the technical solutions according to the embodiments of the invention, the eNB instructs the UE with a short-TTI capability to or not to listen to a downlink control channel in a short TTI, and the UE with a short-TTI capability decides whether to listen to a downlink control channel in a short TTI, according to the explicit or implicit information of the eNB.

Since the UE side listens in a short TTI in response to the instruction of the network side, the UE with a short-TTI capability will only listen when there is a short-TTI service instead of listening to a downlink control channel in each short TTI, so energy will not be excessively consumed and wasted.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for instructing a UE to listen in a short Transmission Time Interval (TTI), the method comprising:
   determining at a network side whether there is a short-TTI service; and instructing the UE to listen to a downlink control channel in a short TTI, only when there is a short-TTI service:
   wherein if there is a short-TTI service, instructing whether the UE needs to listen to a downlink control channel in a short TTI, in Downlink Control Information (DCI) transmitted in a legacy control region, or
   a dedicated instructing channel, or a Media Access Control (MAC) Control Element (CE); or implicitly instructing whether the UE needs to listen to a downlink control channel in a short TTI, according to whether transmitting DCI in a short TTI in the legacy control region;
   wherein instructing whether the UE needs to listen to a downlink control channel in a short TTI, comprises instructing whether the UE needs to listen to a downlink control channel in a short TTI by carrying information in an ON/OFF information field; or
   instructing whether the UE needs to listen to a downlink control channel in a short TTI by instructing a quantity of short TTIs, and/or sequence numbers of short TTIs.

2. The method according to claim 1, wherein the DCI is a DCI capable of carrying a short-TTI control channel instruction.

3. The method according to claim 1, wherein the DCI carrying the short-TTI downlink control channel listening instruction is transmitted in a CSS in a legacy control region of a subframe to instruct a plurality of UEs or a USS in a legacy control region of a subframe to instruct a specific UE; or the short-TTI downlink control channel listening instruction is transmitted in an MAC CE.

4. A method for listening in a short TTI, the method comprising:
receiving at a UE side an instruction instructing whether or not to listen to a downlink control channel in a short TTI; and
listening to a downlink control channel in a short TTI, in response to the instruction instructing to listen to a downlink control channel in a short TTI;
wherein receiving at a UE side an instruction comprises: receiving the instruction instructing whether or not to listen to a downlink control channel in a short TTI, in a DCI transmitted in a legacy control region, or
a dedicated instructing channel, or an MAC CE; or deciding by the UE whether to listen to a downlink control channel in a short TTI, according to whether DCI of a short TTI is received in the legacy control region;
wherein the instruction instructing whether or not to listen to a downlink control channel in a short TTI is received from instructed information carried in an ON/OFF information field; or
the UE is instructed to or not to listen to a downlink control channel in a short TTI, by instructing a quantity of short TTIs and/or sequence numbers of short TTIs.

5. The method according to claim 4, wherein the DCI is a DCI capable of carrying a short-TTI control channel instruction.

6. The method according to claim 4, wherein the DCI carrying the short-TTI downlink control channel listening instruction is transmitted in a CSS in a legacy control region of a subframe to instruct a plurality of UEs or a USS in a legacy control region of a subframe to instruct a specific UE; or the short-TTI downlink control channel listening instruction is transmitted in an MAC CE.

7. An apparatus for instructing a listen in a short TTI, the apparatus comprising
a memory configured to store a computer-readable program and a processor configured to execute the computer-readable program to:
determine whether there is a short-TTI service; and
instruct the UE to listen to a downlink control channel in a short TTI, only when there is a short-TTI service;
wherein the processor is configured to execute the computer-readable program to:
if there is a short-TTI service, instruct whether the UE needs to listen to a downlink control channel in a short TTI, in a DCI transmitted in a legacy control region, or a dedicated instructing channel, or an MAC CE; or
instruct implicitly whether the UE needs to listen to a downlink control channel in a short TTI, by transmitting DCI in a short TTI in the legacy control region;
wherein the processor is configured to execute the computer-readable program to instruct whether the UE needs to listen to a downlink control channel in a short TTI, by carrying information in an ON/OFF information field; or
instruct whether the UE needs to listen to a downlink control channel in a short TTI, by instructing a quantity of short TTIs, and/or sequence numbers of short TTIs.

8. The apparatus according to claim 7, wherein the DCI is a DCI capable of carrying a short-TTI control channel instruction.

9. The apparatus according to claim 7, wherein the DCI carrying the short-TTI downlink control channel listening instruction is transmitted in a CSS in a legacy control region of a subframe to instruct a plurality of UEs or a USS in a legacy control region of a subframe to instruct a specific UE; or the short-TTI downlink control channel listening instruction is transmitted in an MAC CE.

10. An apparatus for listening in a short TTI, the apparatus comprising:
a memory configured to store a computer-readable program and a processor configured to execute the computer-readable program to:
receive an instruction instructing whether or not to listen to a downlink control channel in a short TTI; and
listen to a downlink control channel in a short TTI, in response to the instruction instructing to listen to a downlink control channel in a short TTI;
wherein the processor is configured to execute the computer-readable program to receive the instruction instructing whether or not to listen to a downlink control channel in a short TTI, in DCI transmitted in a legacy control region, or
a dedicated instructing channel, or an MAC CE; or to decide whether to listen to a downlink control channel in a short TTI, according to whether DCI of a short TTI is received in the legacy control region;
wherein the processor is configured to execute the computer-readable program to receive the instruction instructing whether or not to listen to a downlink control channel in a short TTI, from instructed information carried in an ON/OFF information field, or
to receive the instruction instructing whether or not to listen to a downlink control channel in a short TTI, from a quantity number of short TTIs and/or sequence numbers of short TTIs.

11. The apparatus according to claim 10, wherein the DCI is a DCI capable of carrying a short-TTI control channel instruction.

12. The apparatus according to claim 10, wherein the processor is configured to execute the computer-readable program to receive the DCI, carrying the short-TTI downlink control channel listening instruction, transmitted in a CSS in a legacy control region of a subframe to instruct a plurality of UEs or a USS in a legacy control region of a subframe to instruct a specific UE, or to receive the short-TTI downlink control channel listening instruction transmitted in an MAC CE.

* * * * *